(12) United States Patent
Kashima

(10) Patent No.: US 9,239,486 B2
(45) Date of Patent: Jan. 19, 2016

(54) POLYMER DISPERSED LIQUID CRYSTAL FILM, METHOD OF PREPARING THE SAME, AND DISPLAY APPARATUS COMPRISING THE SAME

(71) Applicant: BOE TECHNOLOGY GROUP CO., LTD., Beijing (CN)

(72) Inventor: Miki Kashima, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/378,223

(22) PCT Filed: Dec. 26, 2013

(86) PCT No.: PCT/CN2013/090546
§ 371 (c)(1),
(2) Date: Aug. 12, 2014

(87) PCT Pub. No.: WO2014/206049
PCT Pub. Date: Dec. 31, 2014

(65) Prior Publication Data
US 2015/0338688 A1    Nov. 26, 2015

(30) Foreign Application Priority Data

Jun. 26, 2013  (CN) .......................... 2013 1 0257881

(51) Int. Cl.
*G02F 1/1333* (2006.01)
*G02F 1/1334* (2006.01)
*C09K 19/12* (2006.01)
*C09K 19/54* (2006.01)
*G02F 1/1337* (2006.01)

(52) U.S. Cl.
CPC .............. *G02F 1/1334* (2013.01); *C09K 19/12* (2013.01); *C09K 19/544* (2013.01); *G02F 1/1337* (2013.01)

(58) Field of Classification Search
CPC ............................ G02F 1/1334; C09K 19/544
See application file for complete search history.

(56) References Cited

U.S. PATENT DOCUMENTS

2003/0137624 A1    7/2003  Kang et al.

FOREIGN PATENT DOCUMENTS

| CN | 102464983 A | 5/2012 |
| CN | 103033985 A | 4/2013 |

(Continued)

OTHER PUBLICATIONS

International Search Report, International Preliminary Report on Patentability and Written Opinion of the International Searching Authority of PCT/CN2013/090546 in Chinese, mailed Mar. 27, 2014.

(Continued)

*Primary Examiner* — Phu Vu
(74) *Attorney, Agent, or Firm* — Collard & Roe, P.C.

(57) ABSTRACT

A polymer dispersed liquid crystal film comprises: a first substrate (1) and a second substrate (2) arranged opposing to each other; a first transparent conductive film (3) and a second transparent conductive film (4) arranged on opposing surfaces of the first substrate (1) and the second substrate (2), respectively; and a polymer dispersed liquid crystal layer (5) located between the first transparent conductive film (3) and the second transparent conductive film (4), wherein the polymer dispersed liquid crystal layer (5) comprises homogeneously dispersed bi-axis liquid crystal (51) and polymer (52). When no voltage is applied between the first transparent conductive film (3) and the second transparent conductive film (4), the bi-axis liquid crystal (51) exhibits a random arrangement, and the bi-axis liquid crystal (51) has perpendicular refractive index ($n_1$) and the parallel refractive index ($n_2$), wherein the perpendicular refractive index ($n_1$) and the parallel refractive index ($n_2$) are not equal to each other, and neither of them matches the refractive index of the polymer ($n_p$). A method of preparing a polymer dispersed liquid crystal film and a display apparatus comprising a polymer dispersed liquid crystal film are also disclosed.

12 Claims, 5 Drawing Sheets

(56) References Cited

FOREIGN PATENT DOCUMENTS

| | | |
|---|---|---|
| CN | 103323973 A | 9/2013 |
| JP | 2012-128001 A | 7/2012 |

OTHER PUBLICATIONS

Chinese Office Action of Chinese Application No. 201310257881.0, mailed Mar. 27, 2015 with English translation.

Second Chinese Office Action of Chinese Application No. 201310257881.0, mailed Jul. 24, 2015 with English translation.

S101: Forming a first transparent conductive film on a surface of a first substrate and a second transparent conductive film a surface of a second substrate, respectively.

S102: Forming a polymer dispersed liquid crystal layer between the first substrate and the second substrate so that the polymer dispersed liquid crystal layer is directly located between the first and the second transparent conductive films, wherein the polymer dispersed liquid crystal layer comprises homogeneously dispersed bi-axis liquid crystal and polymer.

Figure 5

S201: Instilling an homogeneous mixture of a bi-axis liquid crystal, a polymerizable monomer, and a photoinitiator onto the first transparent conductive film or the second transparent conductive film.

S202: assembling the first substrate and the second substrate together so that the first and the second transparent conductive films oppose to each other directly, thereby allowing the homogeneous mixture to be located between the first and the second transparent conductive films.

S203: conducting a UV radiation so that polymerizable monomer is polymerized in the presence of the photoinitiator to for a polymer, thereby forming the polymer dispersed liquid crystal layer.

Figure 6

S301: assembling the first substrate and the second substrate together so that the first and the second transparent conductive films oppose to each other.

S302: instilling an homogeneous mixture of a bi-axis liquid crystal, a polymerizable monomer, and a photoinitiator onto the first substrate and the second substrate.

Step S303: conducting a UV radiation so that the polymerizable monomer is polymerized in the presence of the photoinitiator to form a polymer, thereby forming the polymer dispersed liquid crystal layer.

Figure 7

POLYMER DISPERSED LIQUID CRYSTAL FILM, METHOD OF PREPARING THE SAME, AND DISPLAY APPARATUS COMPRISING THE SAME

CROSS REFERENCE TO RELATED APPLICATIONS

This application is the National Stage of PCT/CN2013/090546 filed on Dec. 26, 2013, which claims priority under 35 U.S.C. §119 of Chinese Application No. 201310257881.0 filed on Jun. 26, 2013, the disclosure of which is incorporated by reference.

TECHNICAL FIELD

Embodiments of the present invention relate to a polymeric dispersed liquid crystal film, a method of preparing the same, and a display apparatus comprising the same.

BACKGROUND

Polymer Dispersed Liquid Crystal (PDLC) refers to a material formed by: mixing a low molecular weight liquid crystal with a low molecular weight pre-polymer; allowing the low molecular weight pre-polymer to undergo polymerization to form a polymer in which the liquid crystal is homogeneously dispersed; and producing a material having an electronic-optical characteristic by means of electric anisotropy of the liquid crystal without using a polarizing plate. The optical characteristics of PDLC films depend to a great extent on the matching of effective refractive index of the liquid crystal with the polymer.

The existing PDLC films comprise only one-axis nematic liquid crystals so that they cannot scatter light to a desired extent in the absence of electric field, thereby reducing the contrast of the PDLC films and deteriorating the customs' feelings.

SUMMARY OF INVENTION

To address the aforesaid technical problems, embodiments of the present invention provides a polymer dispersed liquid crystal film exhibiting an improved contrast of PDLC films.

An embodiment of the present invention provides a polymer dispersed liquid crystal film comprising: a first substrate and a second substrate arranged opposing to each other; a first transparent conductive film and a second transparent conductive film arranged on opposing surfaces of the first and the second substrates, respectively; and a polymer dispersed liquid crystal layer located between the first and the second transparent conductive films, wherein the polymer dispersed liquid crystal layer comprises homogeneously distributed bi-axis liquid crystal and polymer.

When no voltage is applied between the first and the second transparent conductive films, the bi-axis liquid crystal exhibits random arrangement, and the bi-axis liquid crystal has a perpendicular refractive index and a parallel refractive index, wherein the perpendicular refractive index and the parallel refractive index are not equal to each other, and neither of them matches the refractive index of the polymer.

In one aspect, the bi-axis liquid crystal is constituted of a rod-like liquid crystal and a discotic liquid crystal, wherein the mass ratio of the rod-like liquid crystal to the discotic liquid crystal ranges from 1:1 to 5:3. For instance, the mass ratio of the rod-like liquid crystal to the discotic liquid crystal can be 5:4.

In another aspect, the polymer dispersed liquid crystal film further comprises a first alignment layer arranged on the surface of the first transparent conductive film facing the bi-axis liquid crystal layer and/or a second alignment layer arranged on the surface of the second transparent conductive film facing the bi-axis liquid crystal layer.

Another embodiment of the present invention provides a method of preparing a polymer dispersed liquid crystal film comprising:
forming a first transparent conductive film on a surface of a first substrate and a second transparent conductive film a surface of a second substrate, respectively; and
forming a polymer dispersed liquid crystal layer between the first substrate and the second substrate so that the polymer dispersed liquid crystal layer is directly located between the first and the second transparent conductive films, wherein the polymer dispersed liquid crystal layer comprises homogeneously dispersed bi-axis liquid crystal and polymer.

In one aspect, the forming a polymer dispersed liquid crystal layer between the first substrate and the second substrate so that the polymer dispersed liquid crystal layer is directly located between the first and the second transparent conductive films, wherein the polymer dispersed liquid crystal layer comprises homogeneously dispersed bi-axis liquid crystal and polymer comprises:
instilling an homogeneous mixture of a bi-axis liquid crystal, a polymerizable monomer, and a photoinitiator onto the first transparent conductive film or the second transparent conductive film;
assembling the first substrate and the second substrate together so that the homogeneous mixture is directly located between the first and the second transparent conductive films; and
conducting a UV radiation so that the polymerizable monomer is polymerized in the presence of the photoinitiator to form a polymer, thereby forming the polymer dispersed liquid crystal layer.

In another aspect, the forming a polymer dispersed liquid crystal layer between the first substrate and the second substrate so that the polymer dispersed liquid crystal layer is directly located between the first and the second transparent conductive films, wherein the polymer dispersed liquid crystal layer comprises homogeneously dispersed bi-axis liquid crystal and polymer comprises:
assembling the first substrate and the second substrate together so that the first and the second transparent conductive films oppose to each other directly;
instilling an homogeneous mixture of a bi-axis liquid crystal, a polymerizable monomer, and a photoinitiator onto the first substrate or the second substrate; and
conducting a UV radiation so that the polymerizable monomer is polymerized in the presence of the photoinitiator to form a polymer, thereby forming the polymer dispersed liquid crystal layer.

In still another aspect, prior to the forming the polymer dispersed liquid crystal layer between the first substrate and the second substrate, the method further comprises:
depositing a first alignment layer on the first transparent conductive film and/or depositing a second alignment layer on the second transparent conductive film.

In still another aspect, prior to the forming the polymer dispersed liquid crystal layer between the first substrate and the second substrate, the method further comprises:
mixing a rod-like liquid crystal with a discotic liquid crystal at a mass ration ranging from 1:1 to 5:3 to form the bi-axis liquid crystal.

Still another embodiment of the present invention provides a display apparatus comprising the polymer dispersed liquid crystal film as described above or prepared in accordance with the method as described above.

DESCRIPTION OF DRAWINGS

For illustrating the technical solutions of embodiments of the present invention or the prior art, hereinafter describes briefly the drawings used for describing the examples. It is apparent that the following drawings are only some examples of the present invention, and persons skilled in the art can obtain other drawings based on these drawings without paying any creative work.

FIG. 5 is the first flowchart the method of preparing the the polymer dispersed liquid crystals film of embodiments of the present invention;

FIG. 6 is the second flowchart the method of preparing the the polymer dispersed liquid crystals film of embodiments of the present invention;

FIG. 7 is the third flowchart the method of preparing the the polymer dispersed liquid crystals film of embodiments of the present invention.

The reference numbers have the following means:
1—first substrate;
2—second substrate;
3—first transparent conductive film;
4—second transparent conductive film;
5—polymer dispersed liquid crystal layer;
51—bi-axis liquid crystal;
511—perpendicular axes;
512—parallel axes;
513—a rod-like liquid crystal;
514—a discotic liquid crystal;
52—polymer;
6—first alignment layer;
7—second alignment layer.

DETAILED DESCRIPTION OF INVENTION

Hereinafter the technical solutions of embodiments of the present invention will be clearly and completely described with reference to the drawings. It is apparent that the described examples are only some, instead of all, of the examples of the present invention. On the basis of the examples of the present invention, all the other examples made by persons of ordinary skill in the art without paying any creative work are encompassed within the present invention.

Figure 1:
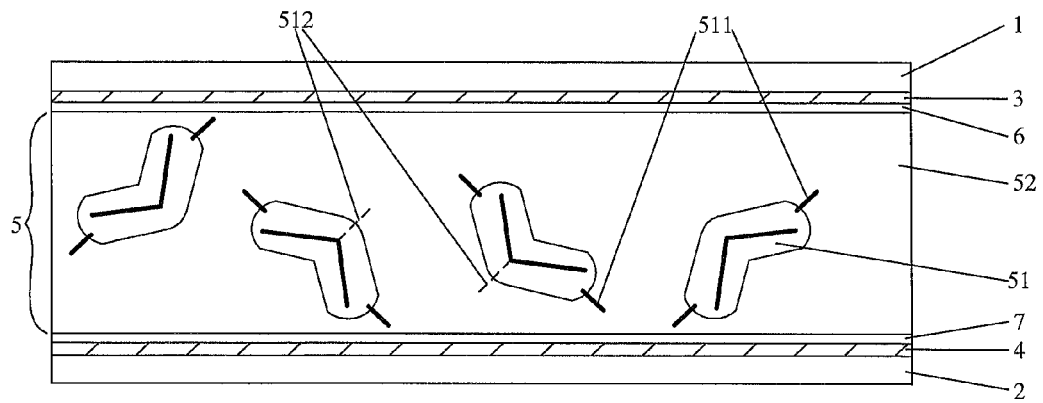
FIG. 1 is the first structural schematic view of the polymer dispersed liquid crystals film of embodiments of the present invention.

As shown in FIG. 1, an embodiment of the present invention provides a polymer dispersed liquid crystal film comprising: a first substrate 1 and a second substrate 2 arranged opposing to each other; a first transparent conductive film 3 and a second transparent conductive film 4 arranged on opposing surfaces of the first substrate 1 and the second substrate 2, respectively; and a polymer dispersed liquid crystal layer 5 located between the first transparent conductive film 3 and the second transparent conductive film 4. The polymer dispersed liquid crystal layer 5 comprises homogeneously dispersed bi-axis liquid crystal 51 and polymer 52. When no voltage is applied between the first transparent conductive film 3 and the second transparent conductive film 4, the bi-axis liquid crystal 51 exhibits a random arrangement. The bi-axis liquid crystal 51 have perpendicular refractive index and the parallel refractive index, wherein the perpendicular refractive index and the parallel refractive index are not equal, and neither of them matches the refractive index of the polymer.

As shown in FIG. 1, the full name of the bi-axis liquid crystal 51 comprised in the polymer dispersed liquid crystal layer is bi-axis nematic liquid crystals. The bi-axis liquid crystal 51 comprises two directing axis perpendicular to each other, which are known as perpendicular axes 511 and the parallel axes 512, respectively. The perpendicular axes 511 and the parallel axes 512 have perpendicular refractive index $n_1$ and the parallel refractive index $n_2$, respectively, and $n_1 \neq n_2$. Meanwhile, neither of the perpendicular refractive index $n_1$ and the parallel refractive index $n_2$ matches the refractive index of the polymer $n_p$, namely, $n_1 \neq n_2 \neq n_p$.

In absence of an externally applied voltage, i.e., when no voltage is applied between the first transparent conductive film 3 and the second transparent conductive film 4, the bi-axis liquid crystal 51 exhibits a random arrangement. Moreover, the perpendicular refractive index $n_1$ and the parallel refractive index $n_2$ are not equal, and neither of them matches the refractive index of the polymer $n_p$; thus, as compared with the existing polymer dispersed liquid crystal layer, the polymer dispersed liquid crystal layer of the embodiments of the present invention exhibits enhanced light-scattering capacity and lower light transmission, thereby increasing the contrast of the polymer dispersed liquid crystal film and improving the consumers' feeling.

When a voltage is applied between the first transparent conductive film 3 and the second transparent conductive film 4, an electric field having electric field lines perpendicular to either of the transparent conductive films is formed within the polymer dispersed liquid crystal layer 5.

Figure 2:
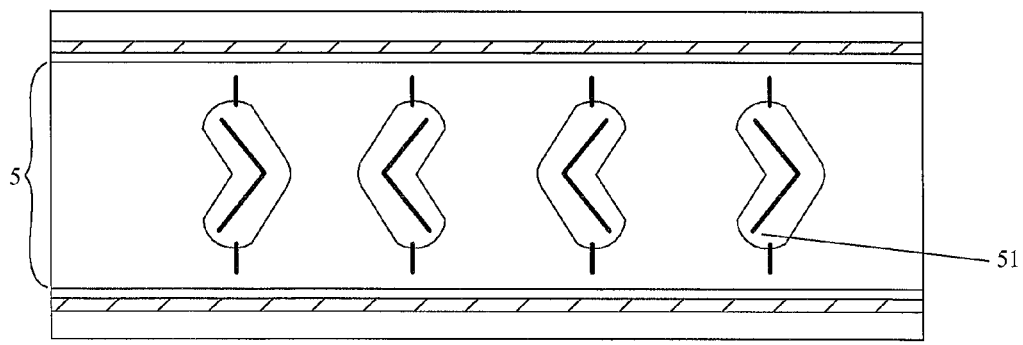
FIG. 2 is the second structural schematic view of the polymer dispersed liquid crystals film of embodiments of the present invention.

As shown in FIG. 2, when the voltage between the first transparent conductive film 3 and the second transparent conductive film 4 is less than a pre-determined value, e.g., less than 20 volts, the perpendicular axes 511 of the bi-axis liquid crystal 51 are parallel to the direction of the electric field lines within the polymer dispersed liquid crystal layer 5, the parallel axes 512 of the bi-axis liquid crystal 51 are perpendicular to the perpendicular axes (namely, perpendicular to the electric field lines), and all of them are randomly arranged.

At this time, the perpendicular refractive index $n_1$ of the bi-axis liquid crystal 51 matches the refractive index of the polymer $n_p$, namely, $n_1 = n_p$. However, the parallel refractive index $n_2 \neq n_p$, namely, the polymer dispersed liquid crystal layer 5 still scatters the incident light, has a relatively lower light transmission, and exhibits semi- or non-transparent.

Figure 3:
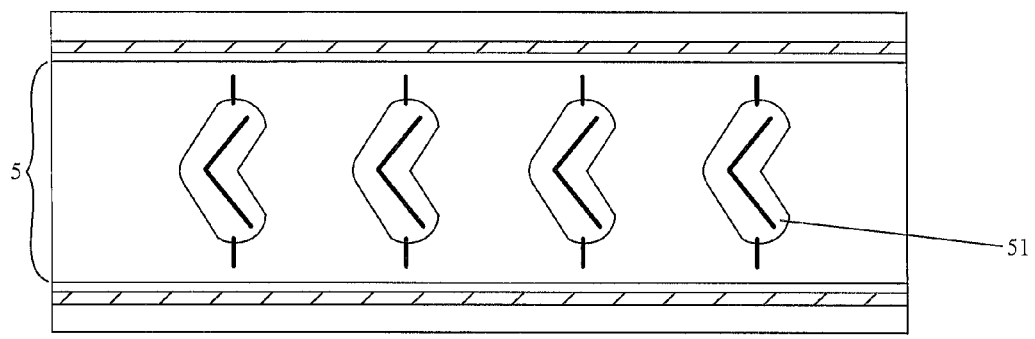
FIG. 3 is the third structural schematic view of the polymer dispersed liquid crystals film of embodiments of the present invention.

Further increasing the voltage between the first transparent conductive film 3 and the second transparent conductive film 4, when the voltage between the first transparent conductive film 3 and the second transparent conductive film 4 is great than or equal to a pre-determined value, e.g., greater than or equal to 20 volts, as shown in FIG. 3, the perpendicular axes 511 of the bi-axis liquid crystal 51 are still parallel to the electric field lines within the polymer dispersed liquid layer 5, the parallel axes 512 of the bi-axis liquid crystal 51 are perpendicular to perpendicular axes 511, and all of them direct to the same direction. For example, as shown in FIG. 3, all the parallel axes 512 of bi-axis liquid crystal 51 direct to left side.

When the bi-axis liquid crystal 51 are arranged in order, the perpendicular refractive index $n_1$ matches refractive index of the polymer $n_p$, and the parallel refractive index $n_2$ matches refractive index of the polymer $n_p$, too. At this time, the refractive indite within the polymer dispersed liquid crystal layer 5 are consistent, and there is not a clear interface inside the layer Thus, the incident light will not be scattered, and can pass through the polymer dispersed liquid crystals film. At this time, the polymer dispersed liquid crystals film exhibits transparent.

In general, the bi-axis liquid crystal 51 are constituted of a rod-like liquid crystal 513 and the a discotic liquid crystal 514, wherein the mass ratio of the a rod-like liquid crystal 513 to the a discotic liquid crystal 514 ranges from 1:1 to 5:3, and wherein the perpendicular axes 511 of the bi-axis liquid crystal 51 are the directing axis of the a rod-like liquid crystal 513, and the parallel axes 512 of the bi-axis liquid crystal 51 are the directing axis of the a discotic liquid crystal 514. Controlling the mass ratio of the a rod-like liquid crystal 513 to the a discotic liquid crystal 514 can provide the bi-axis liquid crystal 51 having desired perpendicular refractive index $n_1$ and the parallel refractive index $n_2$.

Of those, the a rod-like liquid crystal 513 have rod-like molecular conformation; and the a discotic liquid crystal 514 have discotic molecular conformation.

In embodiments of the present invention, the mass ratio of the a rod-like liquid crystal 513 to the a discotic liquid crystal 514 is in a range of from 1:1 to 5:3, such as, 5:4.

Figure 4:
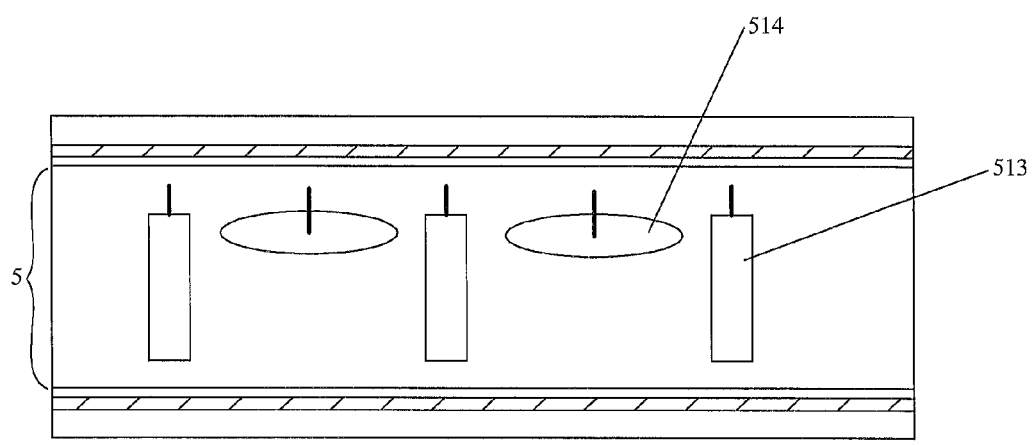
FIG. 4 is the fourth structural schematic view of the polymer dispersed liquid crystals film of embodiments of the present invention.

When the voltage between the first transparent conductive film 3 and the second transparent conductive film 4 is greater than or equal to a pre-determined value, in addition to the case corresponding to FIG. 3, the electric field may further function to destroy the acting force between the a rod-like liquid crystal 513 and the a discotic liquid crystal 514 within the bi-axis liquid crystal 51 so that the a rod-like liquid crystal 513 cannot be combined with the a discotic liquid crystal 514 to form bi-axis liquid crystals. As shown in FIG. 4, in the presence of the electric field, the directing axes of the a rod-like liquid crystal 513 are parallel to the direction of the electric field within the polymer dispersed liquid crystal layer 5, and the directing axes 512 of the a discotic liquid crystal are parallel to the direction of the electric field within the polymer dispersed liquid crystal layer 5, too, so that the refractive index of the a discotic liquid crystal $n_3$ and the refractive index of the a rod-like liquid crystal $n_4$ match the refractive index of the polymer $n_p$, thereby enabling the incident light to pass through the polymer dispersed liquid crystal layer 5 without scattering inside of the layer. At this time, the polymer dispersed liquid crystals film exhibits transparent.

As an example, as shown in FIG. 1, the polymer dispersed liquid crystal film further comprises first alignment layer 6 arranged on the surface of the first transparent conductive film 3 facing the polymer dispersed liquid crystal layer 5, wherein the alignment of the first alignment layer 6 is not particularly limited herein, and can be determined depending on the molecular natures of the bi-axis liquid crystal 51, as well as the desired perpendicular refractive index $n_1$ and the desired parallel refractive index $n_2$ of the bi-axis liquid crystal 51. If the perpendicular refractive index $n_1$ and the parallel refractive index $n_2$ of the bi-axis liquid crystal 51 obtained after arranging the first alignment layer 6, a second alignment layer 7 can be further arranged on the surface of the second transparent conductive film 4 facing the bi-axis liquid crystal layer.

It is to be understood that the polymer dispersed liquid crystal film can comprise only one of the first alignment layer 6 and the second alignment layer 7 as described above, as long as the perpendicular refractive index $n_1$ and the parallel refractive index $n_2$ of the bi-axis liquid crystal 51 can satisfy the practical requirement.

Arranging the first alignment layer 6 and/or the second alignment layer 7 in combination with controlling the mass ratio of the a rod-like liquid crystal 513 to the a discotic liquid crystal 514 within the bi-axis liquid crystal 51 facilitates to obtain the desired refractive index of the perpendicular axes $n_1$ and the desired refractive index of the parallel axes $n_2$ within the bi-axis liquid crystal 51.

For convenience of controlling the voltage between the first transparent conductive film 3 and the second transparent conductive film 4, the second transparent conductive film 4 can be at earth potential. In this case, it is not required to control the potential of the second transparent conductive film 4, but only to provide an appropriate potential to the first transparent conductive film 3, so that an appropriate voltage is applied between the first transparent conductive film 3 and the second transparent conductive film 4. Namely, an electric field having an appropriate intensity of electric filed can be obtained to properly modify the arrangement mode of the bi-axis liquid crystals 51.

The polymer 52 can be conventional polymers, such as, epoxy resins, acrylic resins, or the like.

The polymer dispersed liquid crystal film of embodiments of the present invention comprises homogeneously dispersed bi-axis liquid crystal and polymer in the polymer dispersed liquid crystal layer therein. In the absence of external voltage, the perpendicular refractive index and the parallel refractive index of the bi-axis liquid crystal are not equal, and neither of them matches the refractive index of the polymer. Thus, such polymer dispersed liquid crystal film have better light-scattering capacity and lower light transmission, thereby increasing the contrast of the polymer dispersed liquid crystal film and improving the customers' feeling.

The polymer dispersed liquid crystal film provided in the embodiments of the present invention can be used in liquid crystal display panel, optical modulator, thermosensitive and pressure-sensitive devices, switchable glass, light valve, projection display, electronic book, and the like.

As shown in FIG. 5, another embodiment of the present invention provides a method of preparing a polymer dispersed liquid crystal film comprising:

Step S101: forming a first transparent conductive film on a surface of a first substrate and a second transparent conductive film on a surface of a second substrate, respectively; and Step S102: forming a polymer dispersed liquid crystal layer between the first substrate and the second substrate so that the polymer dispersed liquid crystal layer is directly located between the first and the second transparent conductive films, wherein the polymer dispersed liquid crystal layer comprises homogeneously dispersed bi-axis liquid crystal and polymer, wherein:

in Step S101, the first and the second transparent conductive films can be formed by means of coating, depositing, or sputtering.

In one aspect, as shown in FIG. 6, Step S102 can comprise:
Step S201: instilling an homogeneous mixture of a bi-axis liquid crystal, a polymerizable monomer, and a photoinitiator onto the first transparent conductive film or the second transparent conductive film;
Step S202: assembling the first substrate and the second substrate together so that the first and the second transparent conductive films oppose to each other directly, thereby allowing the homogeneous mixture to be located between the first and the second transparent conductive films; and Step S203: conducting a UV radiation so that polymerizable monomer is polymerized in the presence of the photoinitiator to for a polymer, thereby forming the polymer dispersed liquid crystal layer, wherein, in Step S201, based on the total weight of the bi-axis liquid crystal, the polymerizable monomer, and the photoinitiator, the mass percent of the bi-axis liquid crystal is preferably 80%, the mass percent of the polymerizable monomer is preferably 19% to 19.4%, and the mass percent of the photoinitiator is preferably 0.6% to 1%, and wherein the polymerizable monomer can comprise monomers, such as, epoxy resins, acrylic resins, or the like, and the photoinitiator can be 1-hydroxycyclohexylphenylketone (HCPK);

in Step S202, the first substrate and the second substrate is arranged opposing to each other so that the first and the second transparent conductive films oppose to each other directly, thereby forming a polymer dispersed liquid crystal layer between the first substrate and the second substrate; and in Step S203, the first transparent conductive film and the second transparent conductive film opposing to each other facilitates forming an electric field having parallel electric field lines within the polymer dispersed liquid crystal film.

In another aspect, as shown in FIG. 7, Step S102 can comprise:

Step S301: assembling the first substrate and the second substrate together so that the first and the second transparent conductive films oppose to each other;

Step S302: instilling an homogeneous mixture of a bi-axis liquid crystal, a polymerizable monomer, and a photoinitiator onto the first substrate and the second substrate; and Step S303: conducting a UV radiation so that the polymerizable monomer is polymerized in the presence of the photoinitiator to form a polymer, thereby forming the polymer dispersed liquid crystal layer, wherein:

in Step S301, the assembling the first substrate and the second substrate together so that the first and the second transparent conductive films oppose to each other facilitates forming an electric field having parallel electric field lines within the polymer dispersed liquid crystal film; and in Step S303, based on the total weight of the bi-axis liquid crystal, the polymerizable monomer, and the photoinitiator, the mass percent of the bi-axis liquid crystal is preferably 80%, the mass percent of the polymerizable monomer is preferably 19% to 19.4%, and the mass ratio of the photoinitiator is preferably 0.6% to 1%, and wherein the polymerizable monomer can comprise monomers, such as, epoxy resins, acrylic resins, or the like, and the photoinitiator can be 1-hydroxycyclohexylphenylketone (HCPK).

The bi-axis liquid crystal in the bi-axis liquid crystal layer can comprise a rod-like liquid crystal and a discotic liquid crystal. Among others, the bi-axis liquid crystal can be prepared by means of mixing a rod-like liquid crystal with a discotic liquid crystal at any mass ratio in a range of 1:1 to 5:3. For instance, it can be prepared by means of mixing the rod-like liquid crystal with the discotic liquid crystal at a mass ratio of 5:4 and stirring the mixture homogeneously to for the bi-axis liquid crystal, which is then degassed.

In still another aspect, the method can further comprise: prior to Step S101:

mixing the rod-like liquid crystal with the discotic liquid crystal at a mass ratio in a range of from 1:1 to 5:3 to form the bi-axis liquid crystal.

For the purpose of producing the bi-axis liquid crystal having a perpendicular refractive index and a parallel refractive index, both of which satisfy the practical requirements, the method can further comprise, prior to Step 102:

depositing a first alignment layer on the first transparent conductive film, and/or depositing a second alignment layer on the second transparent conductive film Among others, the first alignment layer 6 can be orientated depending on the molecular characteristics of the bi-axis liquid crystal 51, as well as the perpendicular refractive index $n_1$ and the parallel refractive index $n_2$ of the bi-axis liquid crystal 51 to be obtained. If the perpendicular refractive index $n_1$ and the parallel refractive index $n_2$ cannot yet satisfy the practical requirements after the arrangement of the first alignment layer 6, a second alignment layer 6 can be further arranged on a surface of the second transparent conductive film 4 facing the bi-axis liquid crystal layer.

The method of preparing the polymer dispersed liquid crystal film provided in the embodiments of the present inventions have advantages including ease of handling, high pass yield, and the like. In the absence of external voltage, the produced polymer dispersed liquid crystal film exhibits a relatively high contrast, thereby improving the consumers' feeling.

Still another embodiment of the present invention further discloses a display apparatus comprising the polymer dispersed liquid crystal film of the embodiments of the present invention or prepared in accordance with the method of the embodiments of the present invention. The display apparatus can be any products or parts having display functions, such as, liquid crystal panels, electronic papers, OLED panels, mobile phones, tablet computers, televisions, displays, digital frames, navigators, and the like.

The following examples are provided to further illustrating the present invention in details. Persons skilled in the art can understand that these examples are only for the purpose of illustration, and not intended to limit the scope of the present invention.

EXAMPLE 1

Commercially available ITO glasses were used as the first and the second substrates having the first and the second transparent conductive films thereon, respectively. The glass of the substrates has a dimension of 180 mm×140 mm×0.5 mm, and the ITO film (i.e., the transparent conductive film) thereon has a thickness of 400 Å.

4-cyano-4'-pentyl-para-terphenyl (a rod-like liquid crystal) and 4'-p-n-lauryloxybenzoyloxybiphenyl (a discotic liquid crystal) were homogeneously mixed at a mass ratio of 5:4. The resultant mixture was just the bi-axis liquid crystal used in the present invention, which has a birefractive index of 0.122.

The bi-axis liquid crystal, together with 3,5,5-trimethylhexyl acrylate (a polymerizable monomer) and 1-hydroxycyclohexylphenylketone (HCPK, a photoinitiator) were homogeneously mixed at a mass ratio of 80:19.5:0.5. 2 g of the homogeneous mixture was instilled onto the first transparent conductive film of the first substrate. Then, the first and the second substrates were assembled together so that the gap between the substrates was 10 μm. The instilled homogeneous mixture was directly located between the first and the second transparent conductive films and filled the gap therebetween. The first and the second substrates assembled together and the homogeneous mixture located therebetween were subject to a UV radiation at a wavelength of 365 nm at room temperature for 5 minutes with the radiation intensity of 1.45 mW/cm$^2$ so that the mixture was cured to form a polymer dispersed liquid crystal layer, thereby producing the desired polymer dispersed liquid crystal film.

EXAMPLE 2

PET membranes having a dimension of 500 mm×300 mm×0.1 mm were used as the first and the second substrates. An IZO film with a thickness of 500 Å was applied thereon as the first and the second transparent conductive films.

4-cyano-4'-pentyl-p-terphenyl and 4'-p-n-lauryloxybenzoyloxybiphenyl were homogeneously mixed as a mass ratio of 5:4. The resultant mixture was just the bi-axis liquid crystal used in this example, which has a birefractive index of 0.122.

The bi-axis liquid crystal, together with 3,5,5-trimethylhexyl acrylate and HCPK were homogeneously mixed at a mass ratio of 80:19.5:0.5. The first and the second substrates were assembled together so that the first and the second transparent conductive films opposed to each other together, and the gap between the substrates was 10 μm. 10 g of the homogeneous mixture was instilled between the first and the second transparent conductive films so that the homogeneous mixture was directly located between the first and the second transparent conductive films and filled the gap therebetween. The first and the second substrates assembled together and the homogeneous mixture therebetween were subject to a UV radiation at a wavelength of 365 nm at room temperature for 5 minutes with a radiation intensity of 1.45 mW/cm$^2$ so that the mixture was cured to form a polymer dispersed liquid crystal layer, thereby producing the desired polymer dispersed liquid crystal film

EXAMPLE 3

Commercially available ITO glasses were used as the first and the second substrates having the first and the second transparent conductive films thereon, respectively. The glass of the substrate has a dimension of 180 mm×140 mm×0.5 mm, and the ITO film thereon has a thickness of 400 Å.

4-cyano-4'-pentyl-p-terphenyl and 4'-p-n-lauryloxybenzoyloxybiphenyl were homogeneously mixed at a mass ratio of 5:4. The resultant mixture was just the bi-axis liquid crystal used in this example, which has a birefractive index of 0.122.

A polyimide layer having a thickness of 600 nm is printed onto the first transparent conductive film of the first substrate. The polyimide layer was polymerized at 230° C. for 20 minutes to form an alignment layer.

The bi-axis liquid crystal, together with 3,5,5-trimethylhexyl acrylate and HCPK were homogeneously mixed at a mass ratio of 80:19.5:0.5. 2 g of the homogeneous mixture was instilled onto the second transparent conductive film of the second substrate. Then, the first and the second substrates were assembled together so that the gap between the substrates was 10 μm. The homogeneous mixture was directly located between the first and the second transparent conductive films and filled the gap therebetween. The first and the second substrates assembled together and the homogeneous mixture therebetween were subject to a UV radiation at a wavelength of 365 nm at room temperature for 5 minutes with a radiation intensity of 1.45 mW/cm$^2$ so that the mixture was cured to form a polymer dispersed liquid crystal layer, thereby producing the desired polymer dispersed liquid crystal film.

COMPARATIVE EXAMPLE 1

A conventional polymer dispersed liquid crystal film was prepared in accordance with the same method as Example 1, except that only 4-cyano-4'-pentyl-p-terphenyl was used as the liquid crystals component.

EXAMPLE 4

Test of Preformance

The polymer dispersed liquid crystal films of Examples 1 to 3 and Comparative Example 1 were used to produce liquid crystal panels, respectively, which were test for the light transmissions at scattering state and transparent state. The ratio of the light transmission at scattering state to the light transmission at transparent state was calculated and recorded as contrast. The results are listed in Table 1 below.

TABLE 1

Test Results of Contrasts of Liquid Crystal Panels Comprising the Polymer Dispersed Liquid Crystal Films of Examples and Comparative Examples of the Present Invention

| No. of the Polymer Dispersed Liquid Crystal Film | Contrast |
|---|---|
| Example 1 | >100 |
| Example 2 | >100 |
| Example 3 | >100 |
| Comparative Example 1 | Up to 70 |

It can be seen from the above results that the display produced by using the polymer dispersed liquid crystal film of embodiments of the present invention exhibits a contrast of >100; while the display produced by using a conventional polymer dispersed liquid crystal film exhibits only a contrast of around 70. Thus, when a consumer uses a display apparatus comprising the polymer dispersed liquid crystal film of the embodiments of the present invention, he/she can obtain better feeling.

Hereinbefore are only the specific examples of the present invention, but the present invention is not limited thereto. Any modification or variation, which can be easily accessible for persons skilled in the art without departing the scope of the present invention, is encompassed in the present application. Thus, the scope of the present invention should be defined by the appended claims.

The invention claimed is:

1. A polymer dispersed liquid crystal film comprising:
   a first substrate and a second substrate arranged opposing to each other;
   a first transparent conductive film and a second transparent conductive film arranged on opposing surface of the first substrate and the second substrate, respectively; and
   a polymer dispersed liquid crystal layer located between the first and the second transparent conductive films,
   wherein the polymer dispersed liquid crystal layer comprises homogeneously dispersed bi-axis liquid crystal and polymer,
   when no voltage is applied between the first and the second transparent conductive films, the bi-axis liquid crystal exhibits a random arrangement,
   the bi-axis liquid crystal has a perpendicular refractive index and a parallel refractive index, the perpendicular refractive index and the parallel refractive index are not equal, and neither of them matches the refractive index of the polymer.

2. The polymer dispersed liquid crystal film of claim 1, wherein the bi-axis liquid crystal is constituted of a rod-like liquid crystal and a discotic liquid crystal, wherein the mass ratio of the rod-like liquid crystal to the discotic liquid crystal ranges from 1:1 to 5:3.

3. The polymer dispersed liquid crystal film of claim 2, wherein the mass ratio of the rod-like liquid crystal to the discotic liquid crystal is 5:4.

4. The polymer dispersed liquid crystal film of claim 1 further comprising a first alignment layer arranged on a surface of the first transparent conductive film facing the bi-axis liquid crystal layer and/or a second alignment layer of the second transparent conductive film facing the bi-axis liquid crystal layer.

5. A method of preparing a polymer dispersed liquid crystal film comprising:
   forming a first transparent conductive film on a surface of a first substrate and a second transparent conductive film on a surface of a second substrate, respectively; and
   forming a polymer dispersed liquid crystal between the first substrate and the second substrate so that the polymer dispersed liquid crystal layer is directly located between the first and the second transparent conductive films, wherein the polymer dispersed liquid crystal layer comprises homogeneously dispersed bi-axis liquid crystal and polymer.

6. The method of preparing a polymer dispersed liquid crystal film of claim 5, wherein the forming a polymer dispersed liquid crystal between the first substrate and the second substrate so that the polymer dispersed liquid crystal layer is directly located between the first and the second transparent conductive films, wherein the polymer dispersed liquid crystal layer comprises homogeneously dispersed bi-axis liquid crystal and polymer comprising:
   instilling an homogeneous mixture of a bi-axis liquid crystal, a polymerizable monomer, and a photoinitiator onto the first transparent conductive film or the second transparent conductive film;
   assembling the first substrate and the second substrate together so that the homogeneous mixture is directly located between the first and the second transparent conductive films; and
   conducting a UV radiation so that the polymerizable monomer is polymerized in the presence of the photoinitiator to form a polymer, thereby forming the polymer dispersed liquid crystal layer.

7. The method of preparing a polymer dispersed liquid crystal film of claim 5, wherein the forming a polymer dispersed liquid crystal between the first substrate and the second substrate so that the polymer dispersed liquid crystal layer is directly located between the first and the second transparent conductive films, wherein the polymer dispersed liquid crystal layer comprises homogeneously dispersed bi-axis liquid crystal and polymer comprising:
   assembling the first substrate and the second substrate together so that the first and the second transparent conductive films oppose to each other directly;
   instilling an homogeneous mixture of a bi-axis liquid crystal, a polymerizable monomer, and a photoinitiator between the first substrate and the second substrate; and
   conducting a UV radiation so that the polymerizable monomer is polymerized in the presence of the photoinitiator to form a polymer, thereby forming the polymer dispersed liquid crystal layer.

8. The method of preparing a polymer dispersed liquid crystal film of claim 5, wherein prior to the forming a polymer dispersed liquid crystal layer between the first substrate and the second substrate, the method further comprises:
   forming a first alignment layer on the first transparent conductive film, and/or forming a second alignment layer on the second transparent conductive film.

9. The method of preparing a polymer dispersed liquid crystal film of claim 6 or 7, wherein prior to the forming a polymer dispersed liquid crystal layer between the first substrate and the second substrate, the method further comprises:
   mixing a rod-like liquid crystal with a discotic liquid crystal at a mass ratio of from 1:1 to 5:3 to form the bi-axis liquid crystal.

10. A display apparatus comprising the polymer dispersed liquid crystal film of claim 1.

11. The method of preparing a polymer dispersed liquid crystal film of claim 7, wherein prior to the forming a polymer dispersed liquid crystal layer between the first substrate and the second substrate, the method further comprises:
   mixing a rod-like liquid crystal with a discotic liquid crystal at a mass ratio of from 1:1 to 5:3 to form the bi-axis liquid crystal.

12. A display apparatus comprising the polymer dispersed liquid crystal film prepared in accordance with the method of claim 5.

* * * * *